United States Patent
Stone

(10) Patent No.: US 9,250,786 B2
(45) Date of Patent: Feb. 2, 2016

(54) SNAPPING OF OBJECT FEATURES VIA DRAGGING

(71) Applicant: Adobe Systems Incorporated, San Jose, CA (US)

(72) Inventor: William Amir Stone, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 244 days.

(21) Appl. No.: 13/943,057

(22) Filed: Jul. 16, 2013

(65) Prior Publication Data
US 2015/0026618 A1 Jan. 22, 2015

(51) Int. Cl.
G06F 3/048 (2013.01)
G06F 3/0486 (2013.01)
G06F 3/0488 (2013.01)

(52) U.S. Cl.
CPC ............ *G06F 3/0486* (2013.01); *G06F 3/0488* (2013.01)

(58) Field of Classification Search
CPC .............................. G06F 3/048; G06F 3/0486
USPC ........................................................ 715/769
See application file for complete search history.

(56) References Cited

U.S. PATENT DOCUMENTS

| 2003/0208295 A1* | 11/2003 | Ishii et al. ........................ 700/97 |
| 2012/0116592 A1* | 5/2012 | Koushik et al. ................ 700/276 |
| 2014/0104266 A1* | 4/2014 | Stone et al. .................... 345/419 |
| 2014/0229891 A1* | 8/2014 | O'Byrne et al. ............... 715/790 |

* cited by examiner

*Primary Examiner* — Angie Badawi
(74) *Attorney, Agent, or Firm* — Shook, Hardy & Bacon L.L.P.

(57) ABSTRACT

Example systems and methods of performing a snapping operation in a graphical user interface are presented. In one example, a first user input indicating an initiation of a dragging operation in the graphical user interface is received, wherein the first user input indicates a first location. A source feature corresponding to a source object is determined based on the first location. Also received is a second user input during the dragging operation in the graphical user interface, in which the second user input indicates a current location. A current target feature corresponding to a current target object is determined based on the current location. The source feature corresponding to the source object is snapped to the current target feature corresponding to the current target object.

19 Claims, 12 Drawing Sheets

SNAPPING OF OBJECT FEATURES VIA DRAGGING

FIELD

This application relates generally to data processing and, in an example embodiment, to the graphical "snapping" of object features by way of a single dragging operation in a graphical user interface.

BACKGROUND

In using many graphical drawing software applications, such as Adobe® After Effects® or Microsoft® Visio®, users often desire to connect, abut, or otherwise couple two or more different graphical shapes, objects, or layers together in some precise manner. For example, a user may want to position an end of an arrow with a box in a flow diagram such that the end of the arrow makes contact with a particular point on an edge of the box. In many cases, positioning a specific part of the arrow accurately, such as by use of a mouse or touch input, may be extremely difficult, possibly requiring multiple user attempts.

To facilitate the positioning of these objects, many drawing applications provide an automatic aligning or "snapping" function, whereby a user may position two or more objects by dragging one of the objects in close proximity to another using a mouse or similar input device. In response, the application may automatically position the object being dragged to some location predetermined by the application relative to the other object. The location may be, for example, some point on the object itself, or some reference point in the graphical user interface, such as a grid point or guide point. As a result, the user may possess little or no control over which aspects or features of the objects are snapped together.

Some applications, such as Trimble® SketchUp®, Autodesk® Maya®, Autodesk® AutoCAD®, and Cinema 4D® by MAXON Computer®, allow more user-controllable selection of features or aspects of the multiple objects being aligned or snapped. To access this additional control, users typically are directed to provide multiple input actions or pre-selection of snapping features in addition to the actual dragging operation. These input actions may include, for example, selection of special menu items, movement of special-purpose graphical objects, selection of object features of interest, and the like.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Figure 1A:
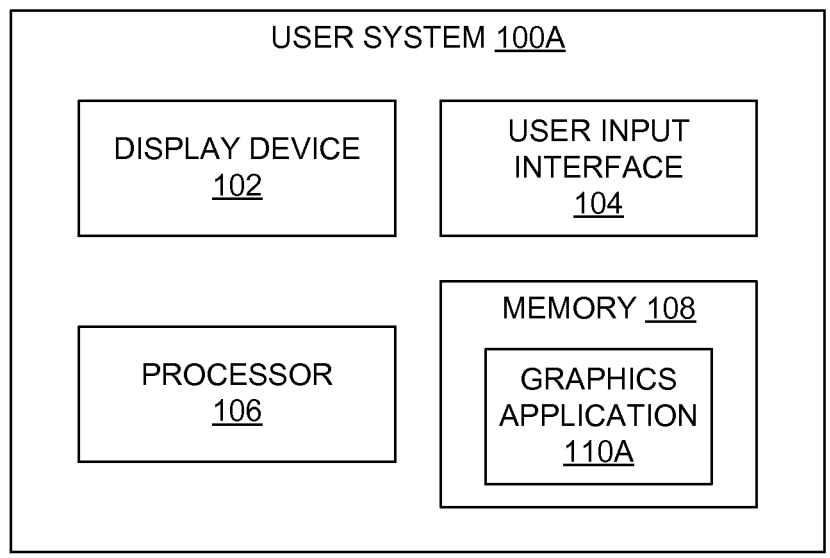
FIG. 1A is a block diagram of an example user system capable of employing the systems and methods described herein.

FIG. 1A is a block diagram of an example user system 100A capable of employing the systems and methods described herein. In an implementation, the user system 100A includes a display device 102, a user input interface 104, a processor 106, and memory 108 including a graphics application 110A to be executed by the processor 106. Other conventional components or devices, such as, for example, a power supply, one or more hard disk drives, one or more communication interfaces, and so on, may be included in the user system 100A, but are not discussed further herein to focus and simplify the following discussion. Examples of the user system 100A may include, but are not limited to, a desktop computer, a laptop computer, a tablet computer, a smart phone, a personal digital assistant (PDA), or any other system capable of facilitating interaction of a user with the graphics application 110A.

The display device 102 may be any device or component capable of presenting a graphical user interface (GUI) to a user. Examples of the display device 102 may include, but are not limited to, a cathode ray tube (CRT) monitor, a liquid crystal display (LCD) monitor, a touchscreen, and the like. The user input interface 104 may be any device or component that facilitates user input to the GUI, such as, for example, a mouse, a joystick, a touchpad, a touchscreen, a gesture recognition component (e.g., the Microsoft® Kinect®), or a similar device. In some implementations, a single device or component, such as a touchscreen, may be employed as both the display device 102 and the user input interface 104. The user input interface 104 may also include a keyboard or similar device to allow the user to submit alphanumeric input via the GUI.

The processor 106 may be one or more processing components, such as microprocessors, digital signal processors (DSPs), graphical processing units (GPUs), or any other component capable of executing at least a portion of the graphics application 110A. The memory 108 may be any data storage component, including, but not limited to, dynamic random access memory (DRAM), static random access memory (SRAM), flash memory, magnetic disk memory, optical disc memory, and the like, capable of storing the graphics application 110A for retrieval and execution by the processor 106.

The graphics application 110A may be any application capable of presenting multiple graphical objects, shapes, layers, or the like in a GUI to a user via the display device 102, and receiving user input via the user input interface 104 to manipulate the graphical objects, including the dragging of objects across at least a portion of the GUI. Examples of the graphics application 110A include, but are not limited to, drawing applications, diagramming applications, vector graphics applications, digital motion graphics applications, visual effects applications, digital compositing applications, graphical modeling applications, computer-aided design (CAD) applications, and computer-aided engineering (CAE) applications, involving either or both two-dimensional and three-dimensional objects.

Figure 1B:
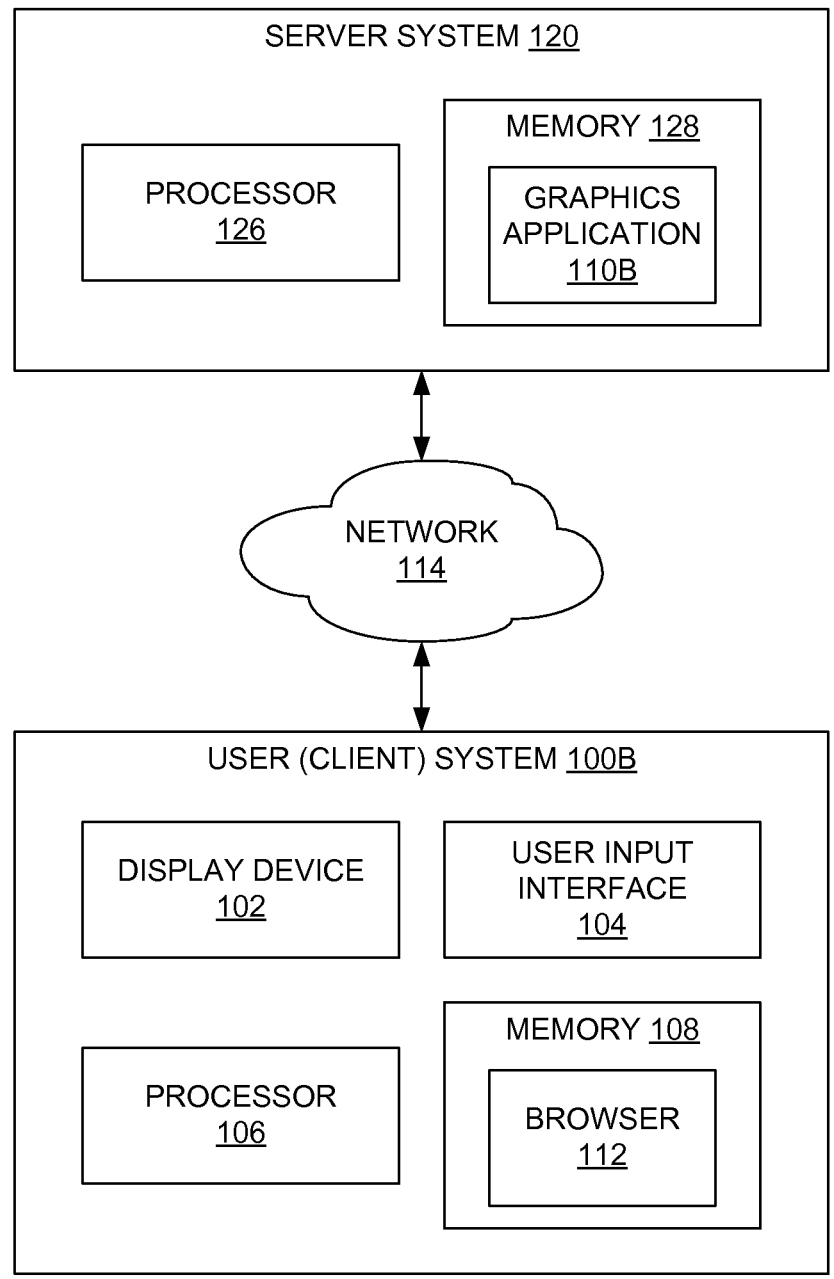
FIG. 1B is a block diagram of an example user system coupled with an example server system in a client-server arrangement capable of employing the systems and methods described herein.

FIG. 1B is a block diagram of an example user (client) system 100B coupled with an example server system 120 in a client-server arrangement capable of employing the systems and methods described herein. Coupling the user system 100B with the server 120 is a communication network 114, examples of which include, but are not limited to, a local-area network (LAN), a wide-area network (WAN) (e.g., the Internet), or any other wired or wireless network capable of communicatively coupling the server system 120 with the user system 100B.

The user system 100B includes, for example, the display device 102, the user input interface 104, the one or more processors 106, and the memory 108 described above in conjunction with the user system 100A of FIG. 1A. Instead of storing the graphics application 110A, the memory 108 may include a browser 112, such as, for example, Microsoft® Internet Explorer®, Mozilla® Firefox®, or another web browser capable of communicating with the server system 120. In another example, the memory 108 of the user system 100B may include a programmatic client that communicates with the server system 120 via an application programming interface (API) (not shown in FIG. 1B) provided in the server system 120.

The server system 120 may include at least one processor 126 and a memory 128 that may be similar to the processor 106 and the memory 108 of the user system 100B. The memory 128 may store a graphics application 110B, which may be a server version of the graphics application 110A of FIG. 1 in one implementation. Thus, the server system 120 executes the graphics application 110B, with which a user of the user system 100B may interact via the display device 102 and the user input interface 104.

Other device and system arrangements may be employed to provide the functionality described herein, as well. Accordingly, the various implementations discussed herein are not limited by the particular computing structure or system utilized.

Figure 2:
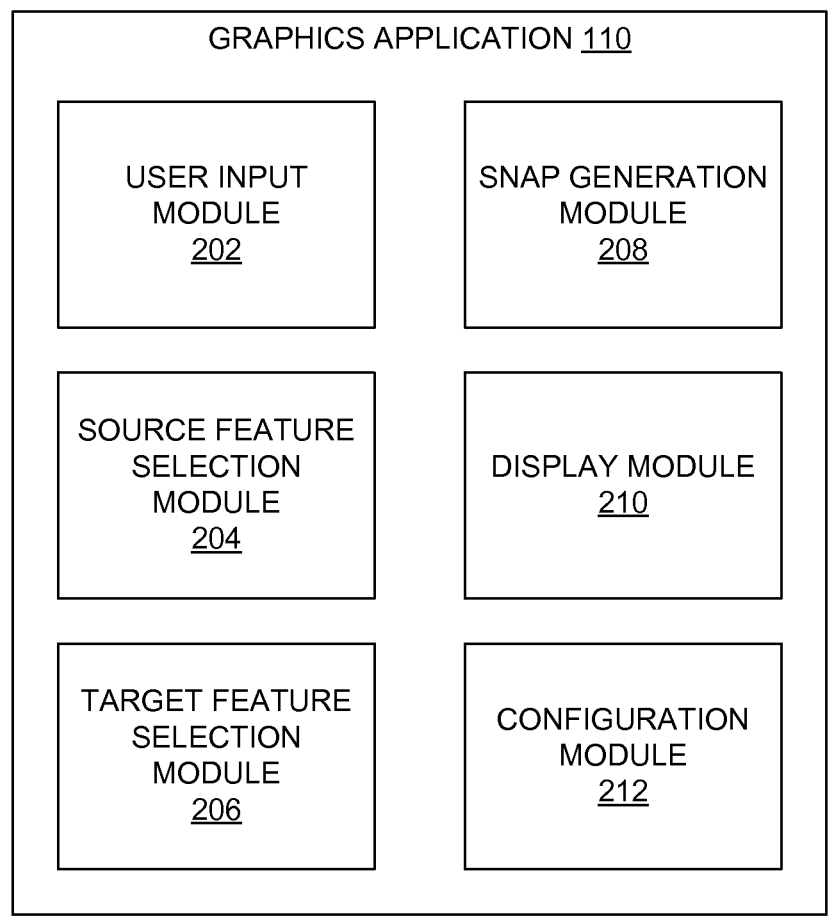
FIG. 2 is a block diagram of an example graphics application employing snapping of objects via dragging in a graphical user interface.

FIG. 2 is a block diagram of an example graphics application 110 employing snapping of objects via dragging in a GUI. Examples of the graphics application 110 include the graphics application 110A of FIG. 1 and the graphics application 110B of FIG. 2. As explained in greater detail below, the graphics application 110, in at least some examples, may facilitate the precise aligning, positioning, or "snapping" together of a source object feature to a target object feature by way of a single dragging operation. Such capability may allow a user to quickly join or otherwise position multiple objects together precisely and quickly without preliminary user actions for each snapping function. Other potential aspects of the graphics application 110 and related embodiments are discussed in greater detail below.

As illustrated in FIG. 2, the graphics application 110 may include a user input module 202, a source feature selection module 204, a target feature selection module 206, a snap generation module 208, a display module 210, and a configuration module 212. Further, some modules of FIG. 2 may be combined with others, or subdivided into further modules. Also, some of the modules shown in the graphics application 110 may be omitted while others may be added in some implementations. In many arrangements, the graphics application 110 includes additional modules to facilitate a range of functions typically associated with a graphics application, such as, for example, creation of graphical objects in a GUI, rearrangement of object locations, duplication or deletion of objects, editing of objects (e.g., resizing, color alteration, etc.), and so forth.

The user input module 202 may receive input from a user of the graphics application 110, such as input that might be entered via a mouse, joystick, touchscreen, keyboard, gesture recognition component, or other user input device. In one example, the user input module 202 receives input as part of a dragging operation, with such input being processed by the source feature selection module 204 and the target feature selection module 206. In some implementations, the user input module 202 may also receive input that may enable or disable the snapping functionality described herein during a dragging operation. The user input module 202 may also receive user input for other functions provided by the graphics application 110 not associated with the dragging operation, but such functionality is not discussed in detail herein.

The source feature selection module 204 may determine, based on user input, a particular feature of an object, shape, or layer to be dragged and snapped to a target feature of the same object or another object. Examples of object features include, but are not limited to, a corner of the object, a side of the object, a side midpoint of the object, and an area or volume midpoint of the object. Possible object features are discussed more fully below in connection with FIGS. 4A and 4B. In one example, the source feature selection module 204 performs the selection in response to a user selecting a location within the source object as an initiation of a dragging operation to be applied to the source object or feature. In one example, a user may indicate the initiation of the dragging operation by way of a pressing of a mouse button, making contact with a touchscreen, and the like. In addition, the selection of the source feature may depend on the distance between the initial location of the dragging operation and each possible source feature of the source object so that the source feature is automatically determined or computed as part of the dragging operation.

The target feature selection module 206 may determine, again based on user input, a particular feature of an object, shape, or layer to which the selected source feature is to be snapped or aligned. In one example, the target feature selection module 206 performs its selection on an ongoing or continual basis during the dragging of the source object or feature based on the current location of the source object or feature being dragged. In some implementations, the target feature selection module 206 may only select a particular target feature when the dragged source object or feature encroaches within some predetermined distance of a potential target feature in the GUI. Moreover, in some implementations, the source feature, once snapped to a particular target feature, will remain snapped thereto within a certain threshold of movement or distance to prevent rapid switching or snapping of the source feature to multiple, closely-spaced potential target features.

The snap generation module 208 may perform the snap operation indicated, in which the selected source feature of the source object is aligned or co-located with the selected target feature of the target object, based on input from both the source feature selection module 204 and the target feature selection module 206. In some examples, the orientation for both the source object and the target object remains unchanged as a result of the snap operation. However, in other implementations, the snapping operations described herein may also be applied to snap features together as a result of a dragging operation for a rotation, scaling, or other non-uniform transformation of an object, such as a deformation operation applied to the object. Further, the snap generation module 208 may track the current cursor position or other present location indicated via user input within the GUI so that a previously snapped source object may be "unsnapped" from a target object if the user continues the dragging operation by dragging the source feature away from the previous target feature before completing the dragging operation.

The display module 210 may communicate with one or more of the user input module 202, the source feature selection module 204, the target feature selection module 206, and the snap generation module 208 to display the results of the dragging operation in the GUI, including any snapping of object features, as is discussed more fully below. The display module 210 may also modify the display in response to other operations of the graphics application 110, but such operations are not discussed in detail herein to focus on dragging operations and the snapping of object features that may result therefrom.

The configuration module 212 may provide configuration information that affects the operation of the source feature selection module 204, the target feature selection module 206, and the snap generation module 210. For example, information in the configuration module 212 may indicate which features of a source object and/or a target object may be snapped together in a dragging operation. The configuration information may also include one or more preset distances across the GUI within which source features will snap to target features, or threshold distances that prevent source features from snapping onto other nearby target features while currently snapped to another target feature. The configuration information may also control or otherwise affect other aspects of the snapping operation in some embodiments, and may be preset within the graphics application 110, or be adjusted to at least some degree by a user.

Figure 3:
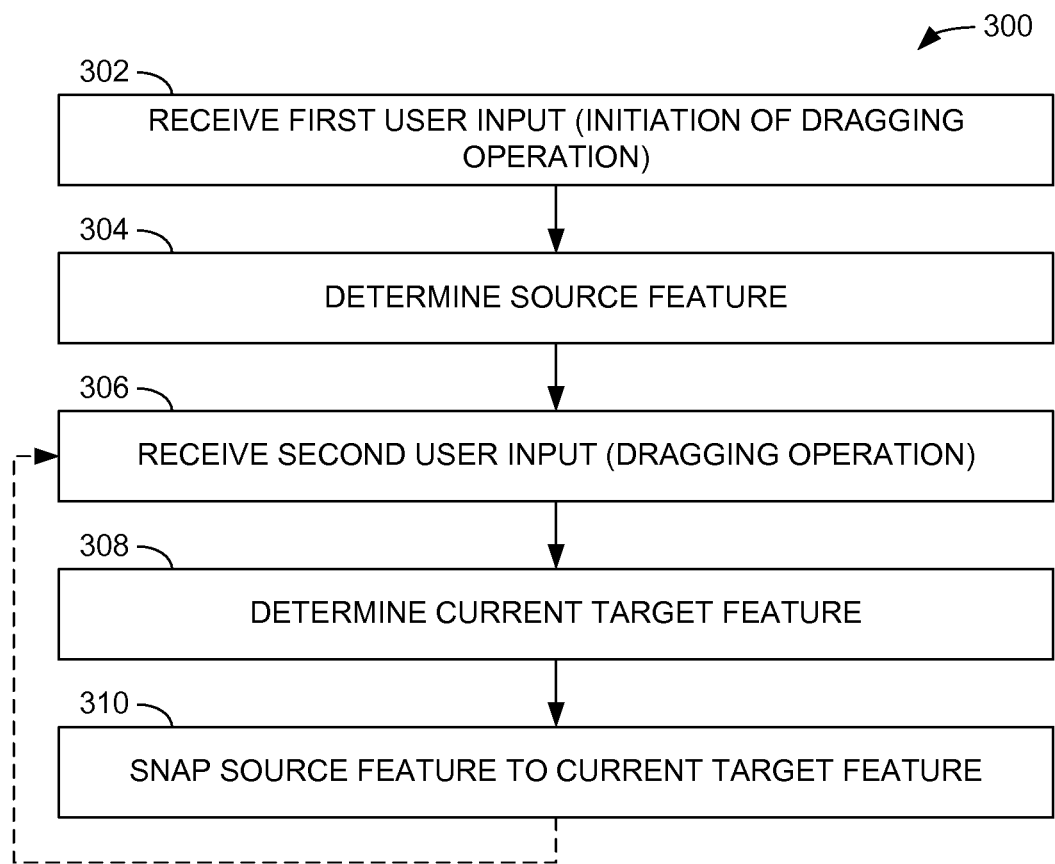
FIG. 3 is a flow diagram illustrating an example method of snapping objects via dragging in a graphical user interface.

FIG. 3 is a flow diagram illustrating an example method 300 of snapping together two object features, such as by way of a user dragging operation. While the various operations of the method 300 may be executed by the graphics application 110, as executed on, for example, the user system 100A of FIG. 1A or the server system 120 of FIG. 1B, other applications, devices, and/or systems may be employed to perform the method 300 in other embodiments.

In the method 300, the user input module 202 may receive a first user input that may indicate the possible initiation of a dragging operation (operation 302). Based on the first user input, the source feature selection module 204 may determine a source feature to be snapped to an as-yet-undetermined target feature (operation 304). The user input module 202 may also receive second user input that may indicate the dragging operation being performed (operation 306). Based on the second user input, the target feature selection module 206 may determine a current target feature to which the source target feature is to be snapped (operation 308). Based on the determination of the current target feature, the snap generation module 208 may then snap the source feature to the current target feature (operation 310).

While operations 302 through 310 of the method 300 of FIG. 3 are shown in a specific order, other orders of operation, including possibly concurrent or continual execution of at least portions of one or more operations, may be possible in some implementations of method 300, as well as other methods discussed herein. In fact, each of the operations 306 through 310 may be performed in a continual, repetitive, or ongoing manner in response to the user continuing to perform the dragging operation in some embodiments, possibly resulting in the source feature being snapped to one source feature, unsnapped from that feature, snapped to another source feature, and so on until the user terminates the dragging operation.

Figure 4A:
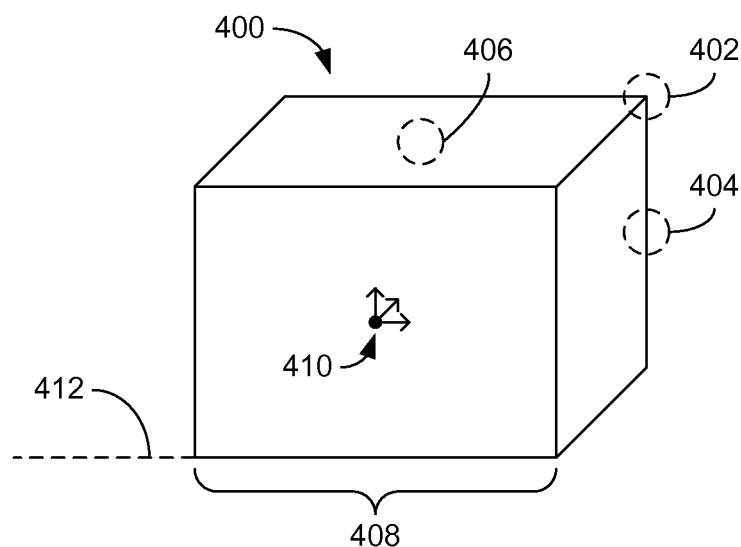
FIG. 4A is a graphical representation of an example three-dimensional object exemplifying features thereof.

FIG. 4A is a graphical representation of an example three-dimensional object 400 that may serve as a source object or target object, with various possible source and/or target features depicted therein. For example, each corner 402 of the object 400 may serve as a potential source feature or target feature. Other possible features may include edge midpoints 404 or side (or face, or plane) midpoints 406. Another possible feature not specifically shown in FIG. 4A is a volume midpoint within the object 400. Each point of an edge 408 may also serve as an object feature in some implementations, as well as an extension or projection line 412 or plane extending from an edge of the object 400. Such a feature may thus allow multiple objects to be aligned along the single line or plane. In addition, an anchor point 410 associated with the object 400 may also serve as a feature. As used herein, an anchor point is a reference point around which a user may transform (for example, rotate, shear, or scale the associated object to alter its orientation, shear, or size) by way of a mouse, touchscreen, or other user input device. In this particular example, the three-dimensional object 400 is a cube. However, any other shape, including both regular (e.g., polygons, boxes, circles, ellipses, spheres, ellipsoids, etc.) and irregular shapes may include, or be associated with, one or more features. For example, spheres may include features such as poles of the sphere, one or more points on an equator of the sphere, a midpoint of the volume of the sphere, an anchor point for the sphere, and so forth. In some implementations, one or more such features may be configured as snappable or unsnappable features by way of configuration information maintained in the configuration module 212, as indicated above.

Figure 4B:
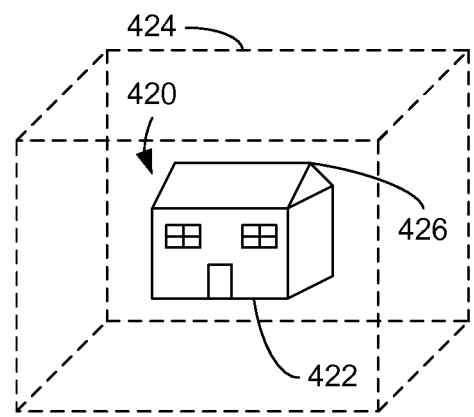
FIG. 4B is a graphical representation of an example three-dimensional object, with associated bounding box, exemplifying features thereof.

FIG. 4B is a graphical representation of another example three-dimensional object 420, with associated bounding box 424. As employed herein, a bounding box is a graphical structure that surrounds a graphical object and that may be manipulated by the user via a user input device to handle or modify the object. For example, a user may move an object, rotate an object, stretch an object, or perform other operations on the object via the bounding box. Various features of the bounding box 424, such as its corners, edge midpoints, edges, volume midpoints, anchor point, and the like, may serve as source or target features for the object in some examples. In addition, the object itself may provide further features for snapping. For example, the object 420 may include one or more explicit point features 426 (e.g., corners or other discontinuities) along the edge of the object 420, as well as any other point 422 along the edge. In some examples, a "mask" (e.g., a user-drawn shape outlining a region in two-dimensional or three-dimensional space) may also serve as a source or target feature. The object 420 may also exhibit edge midpoints, volume midpoints, and other features of its own.

In addition to three-dimensional objects, such as the objects 400 and 420 of FIGS. 4A and 4B, two-dimensional objects also may exhibit snappable features similar to those described above.

Figure 5:
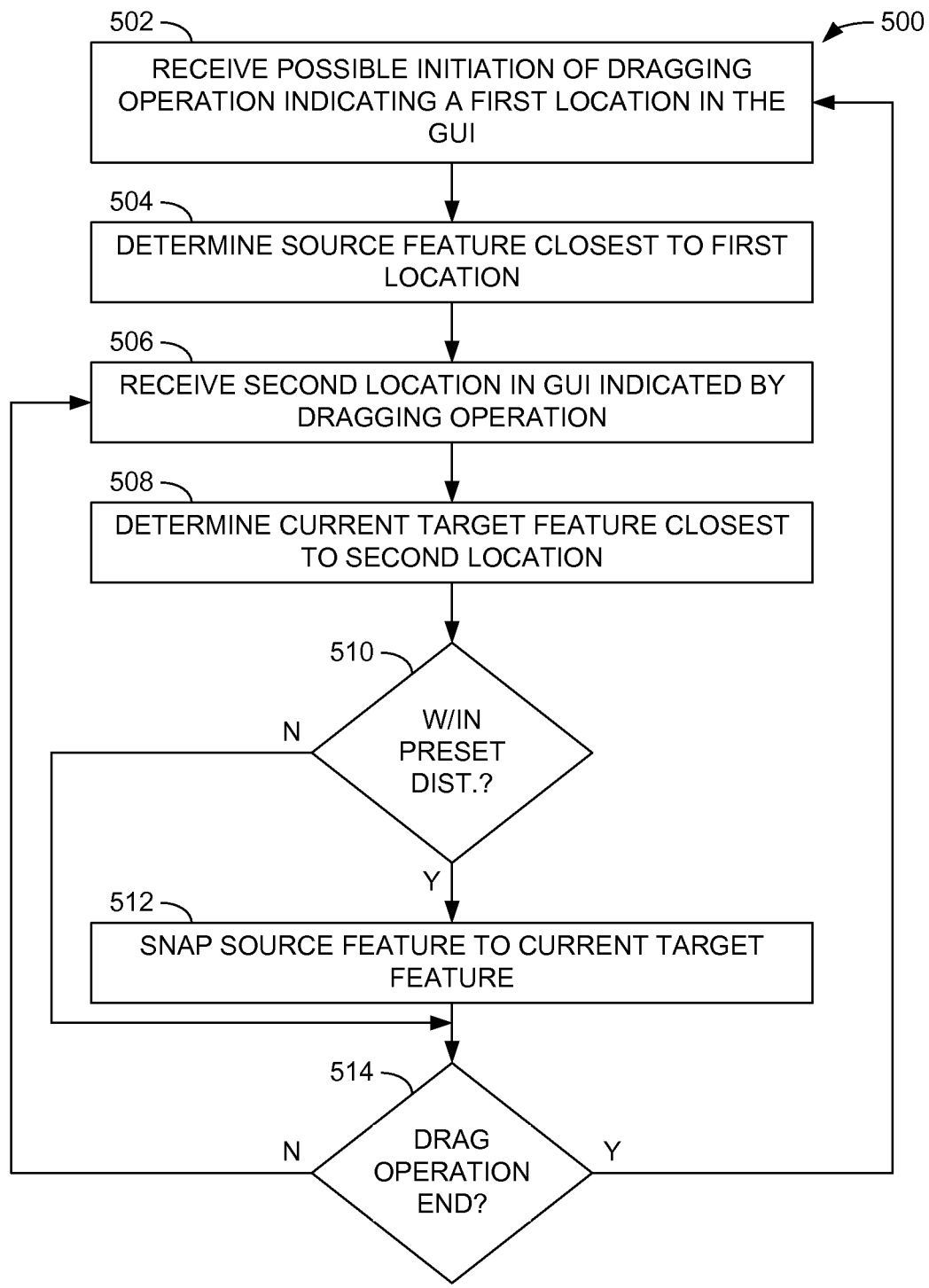
FIG. 5 is a flow diagram illustrating another example method of snapping objects via dragging in a graphical user interface.

FIG. 5 is a flow diagram illustrating another example method 500 of snapping objects via dragging in a GUI. While the method 500 is described within the context of the modules of the graphics application 110 of FIG. 2, other modules of other applications may be employed in a similar fashion. In the method 500, the user input module 202 may receive first user input indicating possible initiation of a dragging operation (operation 502), the first user input indicating a first location in the GUI. The source feature selection module 204 may determine a source feature in the GUI that is closest to the first location (operation 504). In one example, the source feature is a feature of a source object the user intends to drag to another location in the GUI.

The user input module 202 may then receive second user input indicating the dragging operation (operation 506), the second user input indicating a second location in the GUI. The target feature selection module 206 may determine a current target feature in the GUI that is closest to the second location (operation 508). The snap generation module 208 may then determine whether the current target feature lies within some predetermined distance in the GUI from the current source feature (operation 510). Also, operation 510 may also include a determination as to whether the current location exceeds a threshold distance from a previously snapped feature. If the current feature does not lie within the predetermined distance (or does not exceed the threshold distance from a currently snapped feature, if applicable), the user input module 202 may check to see if the user has terminated the dragging operation (operation 514), such as by releasing a mouse button, ending contact with a touchscreen, or the like. In one example, the user may continue dragging the source object mentioned above in the GUI, thus indicating a multiple number of second locations.

If, instead, the snap generation module 208 determines that the current target feature lies within the predetermined distance in the GUI from the current source feature (operation 510) (and, if applicable, exceeds the threshold distance from a currently snapped feature), the snap generation module 208 may snap or align the source feature to the current target feature (operation 512), which the display module 210 may then represent on the GUI being presented to the user. The user input module 202 may then determine whether the dragging operation has been terminated (operation 514), such as by way of a specific user input provided by the user for that purpose, as described above. If the dragging operation is ended, the user input module 202 may then await the next possible initiation of a dragging operation by the user (operation 502). Otherwise, if the dragging operation is not being terminated, the user input module 202 may then await user input associated with a continuing of the dragging operation (operation 506), thus indicating another second location in the GUI.

FIGS. 6A through 6G provide a series of graphical representations of an example of a source feature of one graphical object 600A, 600B being dragged to a target feature of another graphical object 600A, 600B for snapping thereto in a GUI. In this example, the graphical objects 600A, 600B are simple two-dimensional squares. However, in other examples, any graphical objects of interest of the two-dimensional and three-dimensional variety may be the subject of a snapping operation as described below.

Figure 6A:
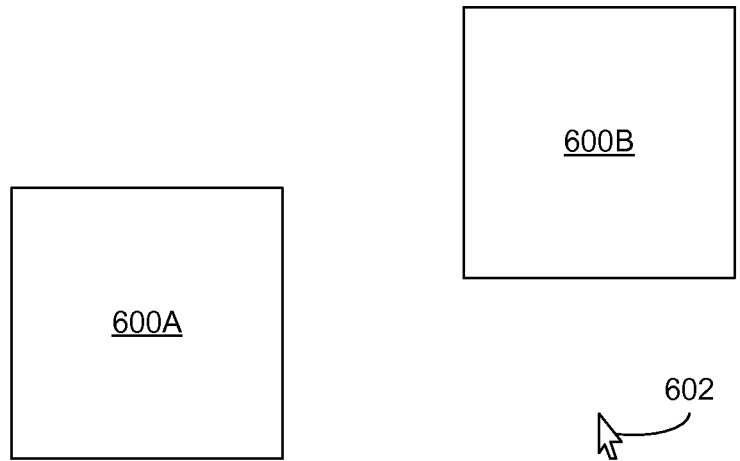
FIGS. 6A through 6G provide a series of graphical representations of an example of a source feature of a source object being dragged to a target feature of a target object for snapping.

In FIG. 6A, two graphical objects 600A and 600B are shown in a GUI, along with a cursor 602. A user, by way of a mouse, joystick, or other user input device, may move the cursor 602 within the GUI and, more specifically, may use the cursor 602 to perform a dragging operation to snap a feature of one of the graphical objects 600A, 600B to another. While the example of FIGS. 6A through 6G specifically involve the use of a cursor 602, other embodiments, such as those in which a touchscreen is employed for user input, may not explicitly display a cursor or similar indication in the GUI. An indication of snap features on both of the graphical objects 600A, 600B may be displayed in the GUI, even in the absence of a cursor.

Figure 6B:
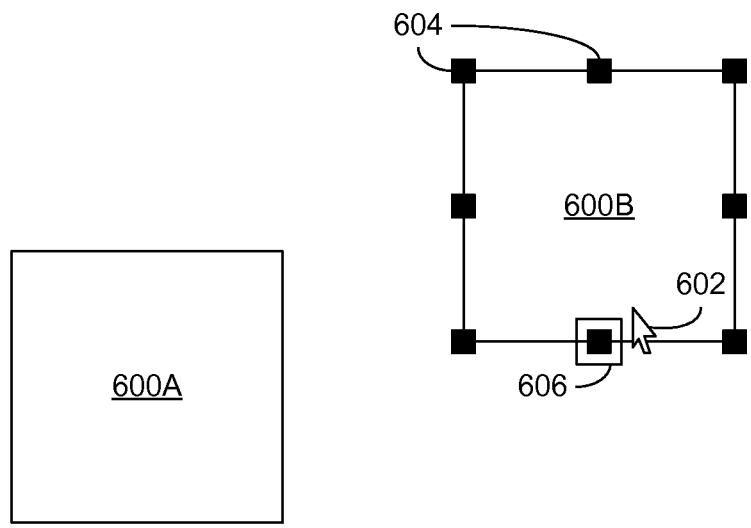

In reference to FIG. 6B, presuming the user desires to snap a feature of one graphical object 600B to a feature of the other object 600A, the user may move the cursor 602 over the graphical object 600B as a source object for the snapping operation to come. As shown in FIG. 6B, the available features 604 (e.g., corners and side midpoints) are displayed on the GUI as small solid boxes. Further, one of the features 604 (e.g., the bottom edge midpoint of the object 600B) is designated as a selected source feature 606 by way of a box surrounding the feature. Other designations for the available features 604 and the selected source feature 606 in the GUI are possible in other implementations. In some examples, the available features 604 and the source feature 606 may be indicated in the GUI as a result of the user hovering the cursor 602 over the intended source object 600B. In other implementations, both the available features 604 and the source feature 606 are indicated in the GUI in response to the user selecting the source object 600B, such as by way of pressing a mouse button or other user input action while the cursor 602 is located over the object 600B. In yet another embodiment, the available features 604 may be designated in response to the cursor 602 hovering over the object 600B, while the source feature 606 may be indicated in response to the user selecting the source object 600B. In addition, such a selection may serve as an initial input for a dragging operation of the source object 600B across the GUI.

In one example, the source feature 606 is selected from the available features 604 by way of the user positioning the cursor 602 closest to the intended source feature 606 compared to other available features 604 and then selecting the source object 600B. Accordingly, the source feature selection module 204 (FIG. 2) may calculate distances between the cursor 602 and each of the available features 604 in the GUI to determine which of the available features 604 is the source feature 606. This determination may be performed continually or repetitively as the user maneuvers the cursor 602 over the source object 600B, or each time the user initially selects the source object 600B prior to dragging the source object 600B.

Figure 6C:
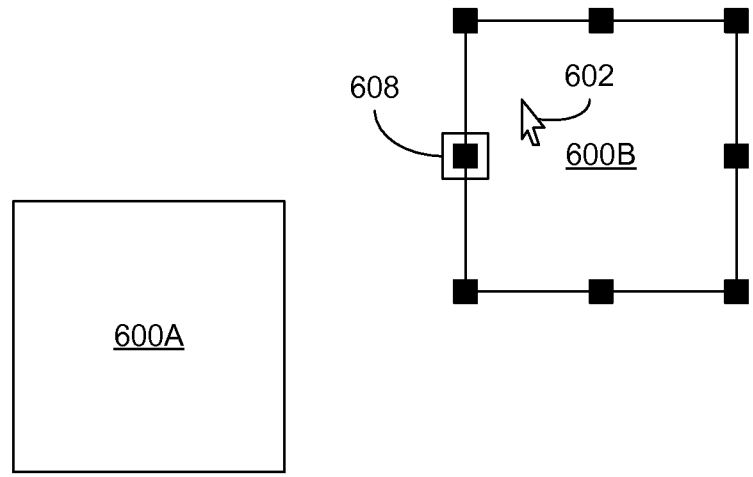

In FIG. 6C, the user has moved the cursor 602 to another location within the source object 600B, causing the left edge midpoint of the source object 600B to be selected as the new source feature 608. In one example, the user selects the location of the cursor 602 as the initiation of a dragging operation (e.g., by pressing a mouse button) to cause the GUI to present the indication of the selection of the new source feature 608 (e.g., an encompassing box). In another implementation, the user need only hover the cursor 602 close to the new source feature 608 to cause the indication of the selection of the new source feature 608 to be provided in the GUI.

Figure 6D:
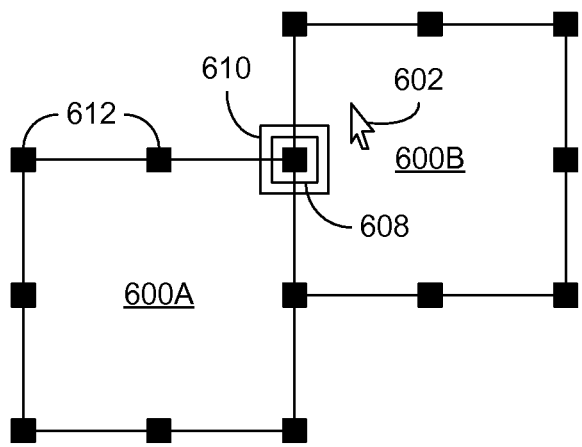

In reference to FIG. 6D, the user then drags the source object 600B toward the target object 600A to snap the current source feature 608 to a yet-to-be-determined target feature of the target object 600A. In one example, the user may drag the source object 600B by moving the cursor while continuing to press a mouse button. As the user drags the source object 600B, the target feature selection module 206 (FIG. 2), determines whether the selected source feature 608 is within some predetermined minimum distance of one of the features 612 of the target object 600A. In FIG. 6D, the selected source feature 608 is dragged within the predetermined distance to one of the available features 612 of the target object 600A (e.g., the upper-right corner of the target object 600A), resulting in the target feature selection module 206 indicating the upper-right corner of the target object 600A as the selected target feature 610 via the display module 210. Also as result of the selection, the snap generation module 208 relocates the source object 600B, aligning or snapping the source feature 608 of the source object 600B with the target feature 610 of the target object 600A. The snapping of the features 608 and 610 is further emphasized by way of a second encompassing box displayed in the GUI via the display module 210.

Figure 6E:
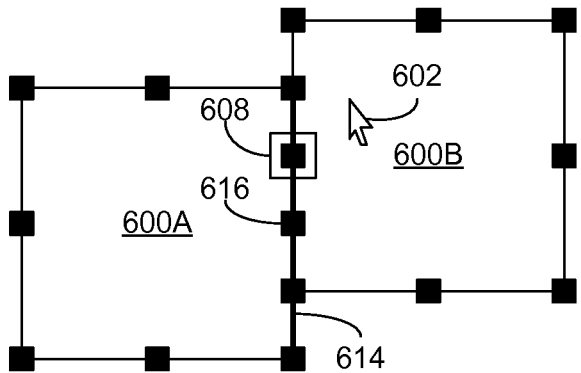

In FIG. 6E, the user continues to utilize the cursor 602 to drag the source object 600B, causing the source feature 608 to be "unsnapped" from the previous target feature 610 of FIG. 6D, and to be snapped instead to a point of the right edge 614 of the target object 600A. As shown in FIG. 6E, the right edge 614 is highlighted (e.g., thickened, changed to a different color, etc.) to indicate the snapping operation. In one example, the user may snap the source feature 608 to any of a plurality of points along the right edge 614 of the target object 600A by sliding the source object 600B along the right edge 614 of the target object 600A.

Figure 6F:
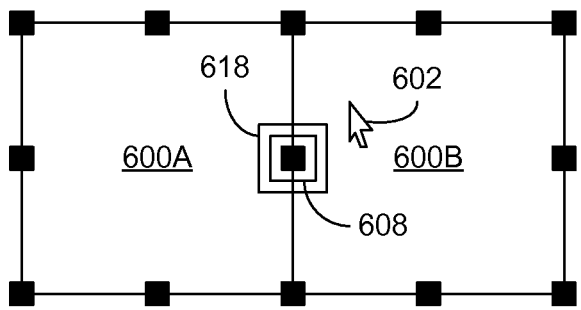

As the user continues to drag the source object 600B, the source feature 608 approaches another available feature: the left-edge midpoint 616 of the target object 600A. As depicted in FIG. 6F, in response to the source feature 608 encroaching within a predetermined distance of the left-edge midpoint 616, the snap generation module 208 snaps the source feature 608 to the left-edge midpoint 616, designated by the target feature selection module 206 as the current target feature 618 by way of a second encompassing box.

Figure 6G:
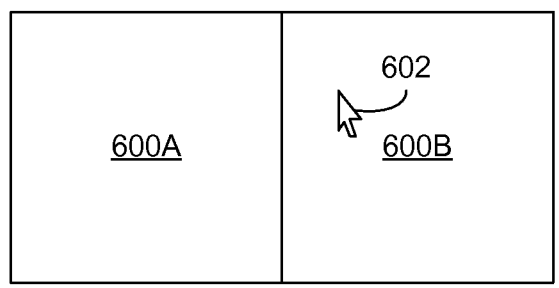

The user may then end the dragging operation, such as, for example, by releasing the button of the mouse that was activated to perform the dragging operation. Accordingly, the snapping of the selected source feature 608 to the selected target feature 618 remains in effect, as shown in FIG. 6G. In one example, in response to the termination of the dragging operation, the various designations for the available source and target features of the source object 600B and the target object 600A, including the selected source feature 608 and the selected target feature 618, are removed from the GUI. The user may then perform any other operations provided by the graphical application 110, including the snapping of objects as described herein.

Figure 7A:
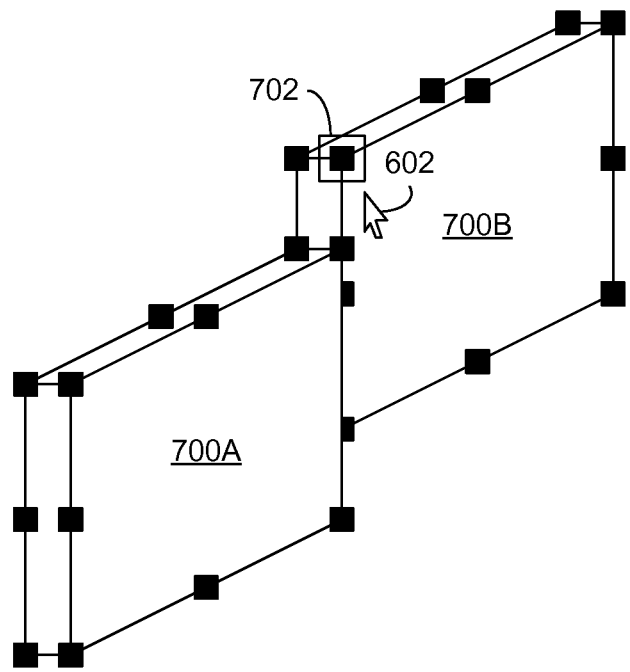
FIG. 7A is a graphical representation of example three-dimensional objects prior to being snapped together via dragging.
Figure 7B:
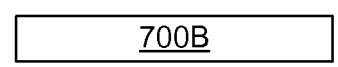
FIG. 7B is a top view of the example three-dimensional objects of FIG. 7A.
Figure 7B:
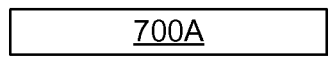
Figure 7B:
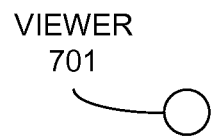

While the example snapping operation of FIGS. 6A through 6G involves two-dimensional objects 600A and 600B, other embodiments of the snapping operation described herein may also be applied to three-dimensional objects. For example, FIG. 7A is a graphical representation of example three-dimensional objects 700A and 700B prior to being snapped together via dragging. More specifically, in FIG. 7A, a user employs the cursor 602 to drag a source object 700B with a selected source feature 702 (e.g., an upper-left corner of the source object 700B) toward one or more features of a target object 700A. The user may accomplish the selection of the source feature 702 and the dragging of the source object 700B in a fashion similar to that discussed above in conjunction with FIGS. 6A through 6G. In the graphical representation of FIG. 7A, the two objects 700A and 700B essentially appear to contact each other. However, as illustrated in FIG. 7B, which is a top view of the arrangement of the graphical representation of FIG. 7A, the appearance of close proximity of the two objects 700A, 700B is due to the orthographic projection onto the viewer 701 with respect to the objects 700A, 700B in the GUI. Instead, in three-dimensional space, the two objects 700A, 700B are offset not only vertically (as seen directly in FIG. 7A) but also both laterally and depth-wise (as seen in the top view of FIG. 7B). In other examples, the objects 700A, 700B may be presented in a perspective projection (as opposed to the orthographic projection of FIG. 7A), in which case the objects 700A, 700B may still appear to be aligned while actually being offset.

Figure 8A:
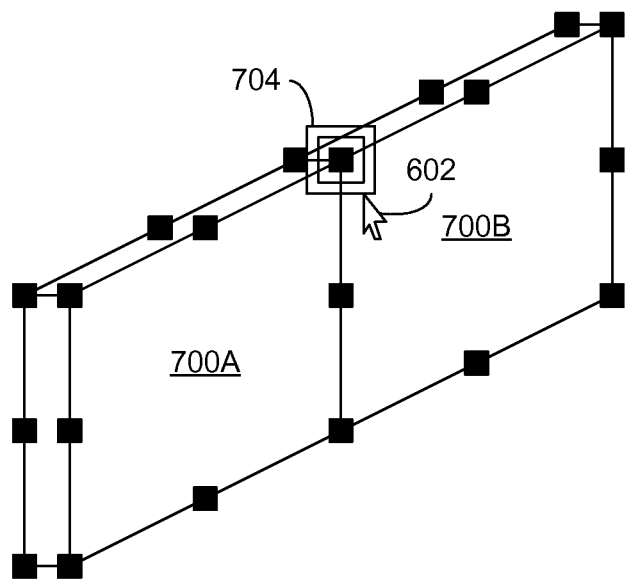
FIG. 8A is a graphical representation of the example three-dimensional objects of FIGS. 7A and 7B after being snapped together via dragging.
Figure 8B:
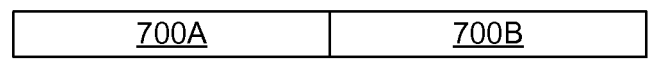
FIG. 8B is a top view of the example three-dimensional objects of FIG. 8A.
Figure 8B:
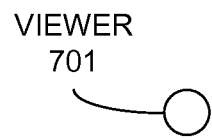

In using the graphical representation of FIG. 7A as a reference, the user may attempt to snap the selected source feature 702 of the source object 700B to the target object 700A by dragging the source object 700B downward in a direction parallel to the camera film plane, even though the two objects 700A, 700B are vertically, laterally, and depth-wise offset from each other. As the user drags the source object 700B downward toward the target object 700A, as presented on the display device, the source feature 702 is moved to within some predetermined distance of the nearest available target feature in two-dimensional screen space as depicted in FIG. 7A, resulting in the source feature 702 being snapped to a target feature 704, as shown in FIG. 8A. Further, as can be seen in the top view of FIG. 8B corresponding to the graphical representation of FIG. 8A, the vertical offset, the lateral offset, and the depth offset in relation to the viewer 701, between the source feature 702 and the target feature 704 of the objects 700A and 700B is eliminated, with the two objects 700A and 700B abutting both on the display device and within the virtual three-dimensional space representation as a result of the snapping operation. Consequently, in dragging a source object 700B to a target object 700A in a two-dimensional view from the viewpoint of the user, the two objects 700A, 700B may be snapped together in three-dimensional space regardless of the actual distance between the objects 700A and 700B in the GUI.

Each of the examples discussed above involves separate source and target objects. However, in other embodiments, the source feature and target feature to be snapped together may belong to the same graphical object. For example, a mesh point defining the shape of a three-dimensional model in an object may be dragged and snapped to another mesh point or snap feature within that same object. In another example, an anchor point of an object may be dragged and snapped to another feature of the same object in order to relocate the anchor point relative to its associated object. This relocating and snapping of the anchor point may allow the user to precisely locate the point about which the object may be rotated to a corner, edge, or other available feature of the object. In another example, an anchor point of one object may be snapped to a target feature of another object.

In one example, the snapping operations described may be enabled or disabled by a user in the graphics application 110 via a menu selection, checkbox, or other user-accessible input of the graphics application 110, with the configuration module 212 of the graphics application 110 maintaining the current enabled or disabled state of the snapping function. Moreover, the configuration module 212 may allow the user to select which types of source and/or target features (e.g., corners, edges, edge midpoints, face midpoints, volume midpoints, anchor points, and so forth) will be available for the snapping operation. Furthermore, as some objects, including their bounding boxes, may be nested within other objects or bounding boxes, the configuration module 212 may allow the user to select whether the features of nested and/or encompassing objects may be available as source or target features.

As indicated in the figures described above, the GUI may graphically or visually indicate (e.g., via surrounding boxes or other visual markers, such as those shown relative to the source feature 702 of FIG. 7A or the target feature 704 of FIG. 8A) the identity of the source and/or target features to be snapped together. In addition, these feature markers may be further enhanced to indicate the particular objects with which these features are associated. In one example, the color of the markers may match an identifying color of the object or layer with which the identified feature corresponds. For example, a selected source feature of a source object identified with the color yellow may be surrounded with a yellow box or marker.

In yet other examples, some of the feature markers may be altered in some way to identify the particular feature type with that marker. Such visual alteration may help the user distinguish between numerous or closely-located features of a complex drawing or graphical display. In one implementation, a volume midpoint may be designated with a double box, as opposed to a single box for other available features of the same object. Further, the feature markers for two separate features, when snapped together, may be combined to indicate the successful snapping of those features. For instance, a volume midpoint of a source object snapped to a volume midpoint of a target object may result in the combined feature point being surrounding by four boxes. Other ways of distinguishing between the various types of features of both source and target objects are also contemplated.

As a result of at least some of the embodiments described above, a user of a graphical application may precisely snap or align a specific, user-selected feature of one object, shape, or layer to another user-selected feature of the same or different object by employing the same type of object-dragging operation facilitated by many applications and operating systems.

Figure 9:
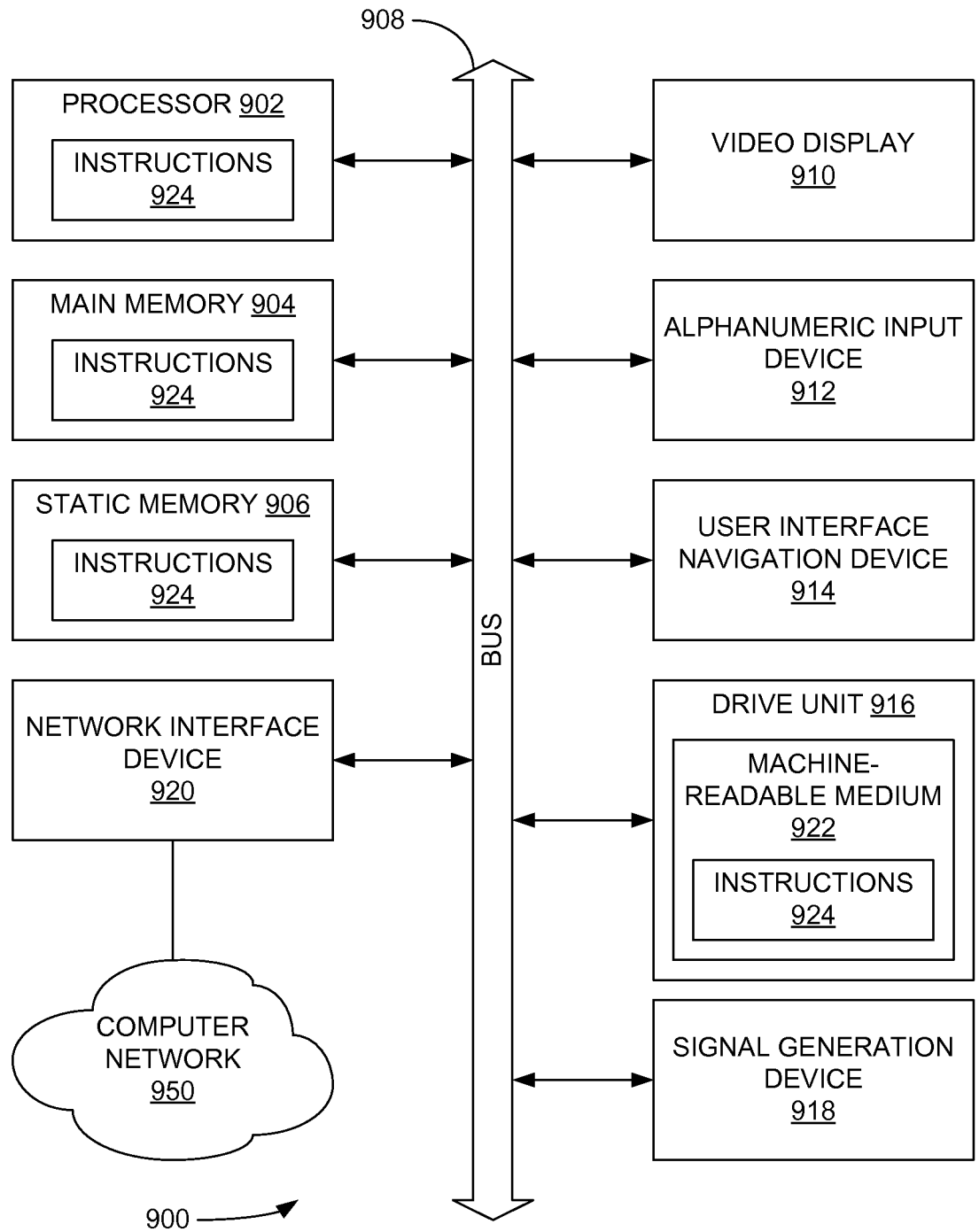
FIG. 9 is a block diagram of a machine in the example form of a processing system within which may be executed a set of instructions for causing the machine to perform any one or more of the methodologies discussed herein.

FIG. 9 depicts a block diagram of a machine in the example form of a processing system 900 within which may be executed a set of instructions 924 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 900 includes a processor 902 (e.g., a central processing unit (CPU), a graphics processing unit (GPU), or both), a main memory 904 (e.g., random access memory), and static memory 906 (e.g., static random-access memory), which communicate with each other via bus 908. The processing system 900 may further include video display unit 910 (e.g., a plasma display, a liquid crystal display (LCD), or a cathode ray tube (CRT)). The processing system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 (a type of non-volatile memory storage) includes a machine-readable medium 922 on which is stored one or more sets of data structures and instructions 924 (e.g., software) embodying or utilized by any one or more of the methodologies or functions described herein. The data structures and instructions 924 may also reside, completely or at least partially, within the main memory 904, the static memory 906, and/or within the processor 902 during execution thereof by the processing system 900, with the main memory 904, the static memory 906, and the processor 902 also constituting machine-readable, tangible media.

The data structures and instructions 924 may further be transmitted or received over a computer network 950 via network interface device 920 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 900) or one or more hardware modules of a computer system (e.g., a processor 902 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 902 or other programmable processor) that is temporarily configured by software to perform certain operations. It will be appreciated that the decision to implement a hardware module mechanically, in dedicated and permanently configured circuitry, or in temporarily configured circuitry (for example, configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 902 that is configured using software, the general-purpose processor 902 may be configured as respective different hardware modules at different times. Software may accordingly configure a processor 902, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (for example, a collection of information).

The various operations of example methods described herein may be performed, at least partially, by one or more processors 902 that are temporarily configured (e.g., by software) or permanently configured to perform the relevant operations. Whether temporarily or permanently configured, such processors 902 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 902 or processor-implemented modules. The performance of certain of the operations may be distributed among the one or more processors 902, not only residing within a single machine but deployed across a number of machines. In some example embodiments, the processors 902 may be located in a single location (e.g., within a home environment, within an office environment, or as a server farm), while in other embodiments, the processors 902 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method of performing a snapping operation in a graphical user interface, the method comprising:
   receiving a first user input indicating an initiation of a dragging operation in the graphical user interface, the first user input indicating a first location in the graphical user interface;
   evaluating respective distances between the first location and a plurality of source features in the graphical user interface;
   determining a source feature corresponding to a source object in response to the source feature having a shortest distance among the respective distances to the first location;
   receiving a second user input during the dragging operation in the graphical user interface, the second user input indicating a current location in the graphical user interface;
   determining, using at least one processor of a machine, a current target feature corresponding to a current target object based on the current location; and
   snapping the source feature corresponding to the source object to the current target feature corresponding to the current target object; unsnapping the source feature corresponding to the source object from the current target feature corresponding to the current target object in response to the source feature being dragged away from the current target feature before completing the dragging operation; and continuously determining a new target feature corresponding to a new target object based on the current location of the source feature during the dragging operation.

2. The method of claim 1, further comprising:
   determining whether the current location is within a predetermined distance of the current target feature corresponding to the current target object;
   wherein the snapping operation is performed based on the current location being within the predetermined distance of the current target feature corresponding to the current target object.

3. The method of claim 1, further comprising:
   receiving a third user input indicating a completion of the dragging operation of the source object;
   determining a final target feature corresponding to a final target object based on the current location corresponding to the third user input; and
   snapping the source feature corresponding to the source object to the final target feature corresponding to the final target object.

4. The method of claim 1, wherein:
   the determining of the source feature corresponding to the source object comprises selecting one of a plurality of possible source features corresponding to a plurality of possible source objects based on the first location.

5. The method of claim 1, further comprising:
   determining whether a new target feature is within a threshold distance of the current target feature corresponding to the current target object; and
   preventing the source feature corresponding to the source object from snapping to the new target feature in response to the determining that the new target feature is within the threshold distance of the current target feature.

6. The method of claim 1, the source feature comprising one of a corner of a bounding box corresponding to the source object, and an edge of the bounding box corresponding to the source object, or one of a corner of the source object and an edge of the source object.

7. The method of claim 1, wherein snapping the source feature comprises causing a non-uniform transformation of the source object or the current target object.

8. The method of claim 1, the source feature comprising one of an anchor point of a bounding box corresponding to the source object and an anchor point of the source object.

9. The method of claim 1, the source feature comprising an extension line of a bounding box corresponding to the source object and an extension line of the source object.

10. The method of claim 1, further comprising at least one of:
visually identifying the source feature in the graphical user interface in response to the determining of the source feature; and
visually identifying the current target feature in the graphical user interface in response to the determining of the current target feature.

11. The method of claim 1, wherein snapping the source feature comprises eliminating a vertical offset, a lateral offset, and a depth offset between the source feature and the current target feature.

12. A non-transitory computer-readable storage medium comprising instructions that, when executed by at least one processor of a machine, cause the machine to perform operations comprising:
receiving a first user input indicating an initiation of a dragging operation in a graphical user interface, the first user input indicating a first location in the graphical user interface;
evaluating respective distances between the first location and a plurality of source features in the graphical user interface;
determining a source feature corresponding to a source object in response to the source feature having a shortest distance among the respective distances to the first location;
receiving a second user input during the dragging operation in the graphical user interface, the second user input indicating a current location in the graphical user interface;
determining a current target feature corresponding to a current target object based on the current location; and
snapping the source feature corresponding to the source object to the current target feature corresponding to the current target object; unsnapping the source feature corresponding to the source object from the current target feature corresponding to the current target object in response to the source feature being dragged away from the current target feature before completing the dragging operation; and continuously determining a new target feature corresponding to a new target object based on the current location of the source feature during the dragging operation.

13. The non-transitory computer-readable storage medium of claim 12, the operations further comprising:
determining whether the current location is within a predetermined distance of the current target feature corresponding to the current target object;
wherein the snapping operation is performed based on the current location being within the predetermined distance of the current target feature corresponding to the current target object.

14. A system comprising:
a display device configured to display a graphical user interface;
a user interface component to receive user input;
data storage for storing data representing a plurality of objects to be displayed on the graphical user interface;
at least one processor; and
memory comprising instructions that, when executed by the at least one processor, cause the at least one processor to perform operations comprising:
receiving, from the user interface component, a first user input indicating an initiation of a dragging operation in the graphical user interface, the first user input indicating a first location in the graphical user interface;
evaluating respective distances between the first location and a plurality of source features in the graphical user interface;
determining a source feature corresponding to a source object in response to the source feature having a shortest distance among the respective distances to the first location;
receiving, from the user interface component, a second user input during the dragging operation in the graphical user interface, the second user input indicating a current location in the graphical user interface;
determining a current target feature corresponding to a current target object based on the current location; and
snapping the source feature corresponding to the source object to the current target feature corresponding to the current target object; unsnapping the source feature corresponding to the source object from the current target feature corresponding to the current target object in response to the source feature being dragged away from the current target feature before completing the dragging operation; and continuously determining a new target feature corresponding to a new target object based on the current location of the source feature during the dragging operation.

15. The system of claim 14, wherein:
the user interface component comprises a mouse input device;
the first user input comprises an activation of a button of the mouse input device;
the second user input comprises movement of the mouse input device; and the first location and the current location comprise locations determined by a cursor location in the graphical user interface corresponding to a position of the mouse input device.

16. The system of claim 14, wherein:
the display device comprises the user interface component, the display device comprising a touch-sensitive display;
the first user input comprises an initial contact with the touch-sensitive display;
the second user input comprises a dragging contact across the touch-sensitive display;
the first location comprising a location of the initial contact with the touch-sensitive display; and
the current location comprising a current location of the dragging contact across the touch-sensitive display.

17. The system of claim 14, wherein the instructions, when executed by the at least one processor, further cause the at least one processor to perform operations comprising:
determining whether a new target feature is within a threshold distance of the current target feature corresponding to the current target object; preventing the source feature corresponding to the source object from snapping to the new target feature in response to the determining that the new target feature is within the threshold distance of the current target feature.

18. The system of claim 14,
wherein determining the source feature comprises determining a feature corresponding to a nested object in a three-dimensional space as the source feature; and
wherein determining the current target feature comprises determining a feature corresponding to another nested object in the three-dimensional space as the current target feature.

19. The system of claim 14, wherein the source object and the current target object belong to a same graphical object before they are snapped together.

* * * * *

UNITED STATES PATENT AND TRADEMARK OFFICE
CERTIFICATE OF CORRECTION

| | | |
|---|---|---|
| PATENT NO. | : 9,250,786 B2 | Page 1 of 1 |
| APPLICATION NO. | : 13/943057 | |
| DATED | : February 2, 2016 | |
| INVENTOR(S) | : William Amir Stone | |

It is certified that error appears in the above-identified patent and that said Letters Patent is hereby corrected as shown below:

In the claims,

Claim 1 (column 14, lines 22-34): Remove the word "and" in line 22, and enter a hard return at line 25 before "unsnapping" and at line 30 before "continuously".

Claim 14 (column 16, lines 11-39): Remove the word "and" from line 28, and enter a hard return at line 31 before "unsnapping" and at line 36 before "continuously".

Claim 17 (column 16, line 66): Enter the word "and" after the ";" and enter a hard return before "preventing".

Signed and Sealed this
Twelfth Day of April, 2016

Michelle K. Lee
*Director of the United States Patent and Trademark Office*